US006854819B2

(12) United States Patent
Lenthall et al.

(10) Patent No.: US 6,854,819 B2
(45) Date of Patent: Feb. 15, 2005

(54) LABEL DISPENSER

(76) Inventors: Mark Lenthall, Stable Yard, Laburnum Cottages, Chiltern Green, Bedfordshire, LU2 9PW (GB); Rainey Waldorf, Stable Yard, Laburnum Cottages, Chiltern Green, Bedfordshire, LU2 9PW (GB)

( * ) Notice: Subject to any disclaimer, the term of this patent is extended or adjusted under 35 U.S.C. 154(b) by 0 days.

(21) Appl. No.: 10/406,902

(22) Filed: Apr. 3, 2003

(65) Prior Publication Data

US 2004/0021706 A1 Feb. 5, 2004

(51) Int. Cl.[7] .......................... B41J 3/00; B42D 15/00; B32B 31/00; B41M 31/00

(52) U.S. Cl. .......................... 347/2; 283/81; 156/384

(58) Field of Search .......................... 347/2; 156/384; 283/81

(56) References Cited

U.S. PATENT DOCUMENTS

| | | | | |
|---|---|---|---|---|
| 4,264,396 | A | 4/1981 | Stewart | 156/361 |
| 4,435,243 | A | 3/1984 | Azeez et al. | 156/361 |
| 4,685,702 | A | 8/1987 | Kazuharu | 283/81 |
| 4,954,840 | A | 9/1990 | Maud et al. | 468/916 |
| 5,915,864 | A | 6/1999 | Austin et al. | 400/708 |

FOREIGN PATENT DOCUMENTS

| | | |
|---|---|---|
| EP | 0 191 495 | 8/1986 |
| JP | 61162356 | 7/1986 |
| JP | 1037340 | 2/1989 |
| JP | 02219730 | 2/1989 |
| JP | 06032338 | 2/1994 |
| JP | 08224914 | 9/1996 |
| JP | 09300730 | 11/1997 |
| JP | 10086921 | 4/1998 |
| JP | 11170625 | 6/1999 |
| JP | 11255209 | 9/1999 |

*Primary Examiner*—Michael S. Brooke
(74) *Attorney, Agent, or Firm*—St. Onge Steward Johnston & Reens LLC

(57) ABSTRACT

The present invention concerns the field time/date labelling of products or packaging for products, such as those having a limited life before perishing. According to the present invention there is provided a device for dispensing labels marked with time information relating to a time-dependent characteristic of a product, which device comprises: clock means for generating current time information; time adjustment means for logging an adjustment time period and adding the period to the current time information thereby to generate future time information; user responsive actuation means for sampling current time information and the calculated future time information; label marking means for marking sampled time information onto the labels; and a label dispensing mechanism for dispensing marked labels from the device, wherein in the actuation means is adapted to permit device operation at least two user-selectable modes, the first mode providing a label marked with the current time information and not the future, and the second mode providing a label marked with future time information, and optionally the current time information.

10 Claims, 3 Drawing Sheets

LABEL DISPENSER

This application is a continuation of pending International Patent Application No. PCT/GB01/04395 filed Oct. 3, 2001, which designates the United States and claims priority of pending British Application No. 0024190.1, filed Oct. 3, 2000.

The present invention concerns the field time/date labelling of products or packaging for products, such as those having a limited life before perishing. A particular aspect of the invention concerns labelling of packages for consumer products. The invention provides a device which produces labelling having a graphic indication related to the time of opening of the package, or some other time related characteristic of the product or package. The device has particular applications in the fields of food packaging and drug packaging or samples, but will find application in a wide range of fields.

It is well known to provide packaging for perishable products with a date marking indicating a time of manufacture or a use by/consume by/best before date. This allows the user to see within what time period the food or drug or other product may safely be used. A problem exists when the opening of a sealed package modifies the use-by period, typically decreasing the time within which the packaged product must be used. The opened product may have a considerably reduced lifespan before it perishes.

Hence it is common to have a label such as "use within x days of opening." In this way a user can calculate when to use an opened product. A problem arises when the user may return to an opened package and not remember when it was opened. The user will then be unable to calculate whether the food or product is still in a fit state for use or consumption. In this case if there is any doubt the user will discard the product, or risk using an out of date product which may be harmful or otherwise objectionable. The discarding of fresh food products in particular is a major source of domestic waste, but unavoidable in view of the number of prepackaged and refrigerated products commonly purchased. Every year significant proportions of bought food is prematurely discarded and wasted because the consumer is unable to remember or determine a use-by date once the package has been opened and stored for a while. Similarly certain drug compositions are environmentally unstable and may include active ingredients which are degraded once the packaging has been opened. For this reason drugs may be needlessly discarded or, potentially dangerously, used when they have lost their effectiveness. In the interests of food hygiene it would be beneficial to have a clear indication of when a product is safe to consume, even where the life of a food product depends upon the time or date of opening of the product's packaging. Typically this currently involves relying upon the opener's memory and conducting a calculation according to package indications such as "eat with 1 week of opening".

Japanese patent publication number 09-300730 (English language abstract) discloses a food label printer which is associated with a data storage device which has a record of "sell by" periods for a range of pre-cooked foods. In a labelling process, the type of food is entered and sell by labels are generated by adding the sell by period to the current time, to provide a printed label having a sell by date or time for the particular pre-cooked food.

Japanese patent publication number 08-224914 (English language abstract) discloses a label printer for printing "consume by" data on a label to be attached to food packaging. The device includes a calender means which provides the present date, and means for inputting an "appreciation period" to the device. This period is stored and added to the current date in order to generate a consume-by date, which is printed onto a label.

EP-A-0 191 495 discloses a desk-top thermal printer for printing self-adhesive labels, which demonstrates the availability of small scale label printing technology. U.S. Pat. No. 4,264,396 discloses another label printer.

It is an object of the present invention to provide a labelling system which permits the printing of a label provided with time or date data which provides information with regard to attain a notional or real time-dependent characteristic of a product. The characteristic may be a use by or consume by date indicative of the time from opening of a packaged perishable product until it is no longer guaranteed to be suitable for use.

According to another aspect of the present invention there is provided a device for dispensing labels marked with time information relating to a time-dependent characteristic of a product, which device comprises: clock means for generating current time information; time adjustment means for logging an adjustment time period and adding the period to the current time information thereby to generate future time information; user responsive actuation means for sampling current time information and the calculated future time information; label marking means for marking sampled time information onto the labels; and a label dispensing mechanism for dispensing marked labels from the device, wherein the actuation means is adapted to permit device operation at least two user-selectable modes, the first mode providing a label marked with the current time information and not the future, and the second mode providing a label marked with future time information, and optionally the current time information.

The characteristic may be the storage term of a product in a recently opened package before the product is no longer considered or guaranteed to be fresh, or suitable for consumption or use. Such products include foodstuff and perishable drugs. In fact the present invention will find application in relation to any product having a restricted shelf-life after opening. The invention is particularly useful for providing a use by or consume by date for products which are packaged in hermetically sealed packaging and which have a limited life after sealing. However the invention is not restricted solely to this field and may find application for example in the processes where products are associated with a curing time or a drying time.

By operating in two modes, the device is capable of printing solely a current time—e.g. time of opening—or a future time indicative of a characteristic of the labelled product, such as by when the labelled packaged product must be used. The device has particular application at the point of use of a product, such as a kitchen or hospital drug dispensary. Typically, as soon as the packaging of a perishable or short life term product is opened, and for example an hermetic packaging seal is broken, the device is used to print a label which may provide time of opening data, by which the use-by date or time may be calculated by a reader of the label. Alternatively the device may print a label indicating both time of opening and time by which the product should be used.

In another embodiment the actuation means may have three user-selectable modes, a first mode in which the current time data is printed, a second mode in which the current and future time data is printed, and a third in which the future and not the current time data is printed on the label.

In a mode of use for the device, the user inspects the packaging of the product to be opened and ascertains a pre marked "use/consume within" period, such as within three days of opening. The clock means provides the current date/and or time—the current time information. The use/consume within period is entered into the time adjustment means and may be added to the current date/time to provide a calculated date or time within which the product must be consumed—the future time information.

According to the particular embodiment, the future time information and/or the current time information is communicated to a print head and printed onto a label, which label is then dispensed. The label may be manually or directly applied to the product as (or soon after or soon before) it is opened to provide a readily recognisable final consumption/use date or time for the product.

An advantage of the present invention is that the user does not have to remember when a product is opened and therefore avoids the wasteful disposal of products which are still usable, or the hazardous use of products that are past their use by date. In a particularly useful mode, the label may provide the final "consume by" time or date, thereby removing the need for the consumer to calculate that date/time.

Upon opening a product selection, of the first mode produces a label marked with current time information corresponding to the time of opening. This allows a user of the product to know when the packaging was opened. Selection of the second mode allows the user to know both when the product was opened and also, without reference to the product packaging, when the product is to be used by. Selection of the third mode solely tells the user the date by which the product must be used.

The devices of the present invention will also be useful where an initial package seal is broken, modifying product life span, and the product is then repackaged. The repackaged product will require a new indication of product lifespan, and the present invention can provide a label having that information to be applied to the new packaging.

In the preferred embodiment the actuation means includes manual inputting means for selecting the time adjustment period which is the time period added to the current time information to arrive at the future time information. The actuation means may also include display means for displaying current and/or calculated future time information. Preferably the actuation means comprises a microprocessor capable of logging input time adjustment period data.

The actuation means may include an actuation button for initiating information sampling, label marking and label dispensing. Alternatively, information sampling, label marking and label dispensing may be initiated by applying a pulling force to a protruding portion of the label.

The label marking means may comprise a print mechanism. Alternatively, the label marking means may be an impress device. Marking may include the application of a touch distinguishable mark, such as a Braille characters for use by the blind.

The time adjustment means may provide a fixed predetermined separation period. This is useful where a plurality of packages having an identical or similar "use within x days of opening" period (or the like) will be opened during use of the device. Preferably though, the time adjustment means will log a time period inputted by a user, allowing programming of the device for various product/packaging combinations and applications.

The clock means may be user programmable to permit time setting and adjustment, as is common in the field of electronic clocks.

Preferably the device is portable. The device may be provided with mounting means for attaching the device to a surface. Preferably the mounting means allows the device to be detached and re-attached to the surface. The mounting means may be a magnet, or self-adhesive pads or mounting screws or bolts or the like. Alternatively the mounting means may be a weight placed in the base of the device to provide a degree of movement resisting inertia.

The device may be powered by batteries. Alternatively, the device may be mains powered.

The displayed time information may be tailored to the sensitivity of the required application. For example the time information could simply be calender information i.e. the day of the month and month of the year. Alternatively the time information could simply be a time of day.

In one embodiment the time information comprises the day of the week, the day of the month and the week of the year. In another embodiment the time information comprises the day of the month, the month of the year and the year.

The period of time added to the current time information to generate the future time information may be selectable. Preferably the period of time may be selected to be between 1 and 99 days.

Following is a description by way of example only and with reference to the drawings of a method of putting the present invention into effect.

Figure 1:
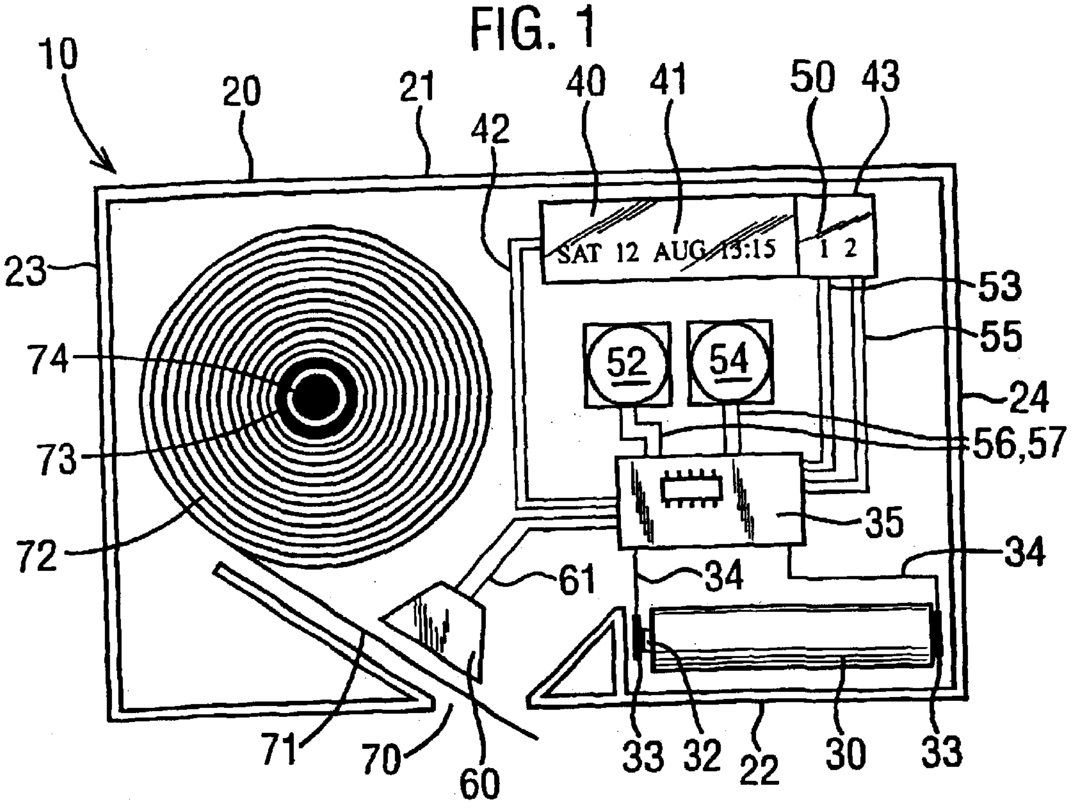
FIG. 1 is a schematic plan view of the interior of a device according to the present invention.

A label dispenser is shown generally as 10 in FIG. 1. Label dispenser 10 has a casing 20. Casing 20 is generally rectilinear and formed from moulded plastics material. Casing 20 has a top wall 21, a bottom wall 22, short side walls 23&24, a front face (not shown) and a rear face (25 in FIG. 2). A battery 30 is removably mounted by conventional means in a corner region of casing 20. Battery 30 is shown as an AA-size battery but could alternatively of a different size, such as a button type battery used in watches and the like. Battery 30 has terminals 32 which are in contact with electrical contacts 33. Electrical contacts 33 are connected by wires 34 to provide power to a microprocessor controller circuit 35. Microprocessor 35 is connected to, and controls, the other electrical components described below.

Display 41 is an LCD display of the type known in the field of digital clocks and watches. Display 41 is divided into two regions, a default display 42 and an input display 43. Default display 42 displays the present time and date as calculated by a clock function of the microprocessor 35. The date is given as the day of the week, the day of the month and the month of the year. The day of the week and month of the year are displayed as three letter abbreviations. The time is given in the 24 hour clock format.

Input display 43 has two digits, a tens digit 50 and a units digit 51. Each displayed digit is capable of being increased incrementally in response to repeated pressing of a button 52 or button 54. Of course it will be possible in alternative embodiments to have a microprocessor programmed to respond to continuous depression of the button or buttons to provide continuous incrementation. Buttons 52 and 54 are connected to the microprocessor unit by wires 56,57 respectively. The microprocessor unit is connected to the digits 50,51 by respective printed circuit board leads 53,55.

Front face (not shown) of casing 20 is designed such that display 41 is visible and buttons 52 and 54 are accessible.

Microprocessor unit 35 is linked to a print head 60 by PCB tracks 61. Print head 60 is of the type common in the art of printing, and may for example be of a dot matrix, thermal, inkjet or laser type. These are common in the field of printing onto labels, and are therefore not described in further detail.

Print head 60 is located adjacent a slot 70 in casing side wall 22. A free end 71 of a spooled label reel 72 protrudes through the slot. The reel comprises a sequential plurality of self-adhesive labels provided on an easy release backing ribbon. Reel 72 is rotatably mounted in, a spigot 74. Spigot 74 is fixed upstanding from the interior rear face of the casing 25.

Figure 2:
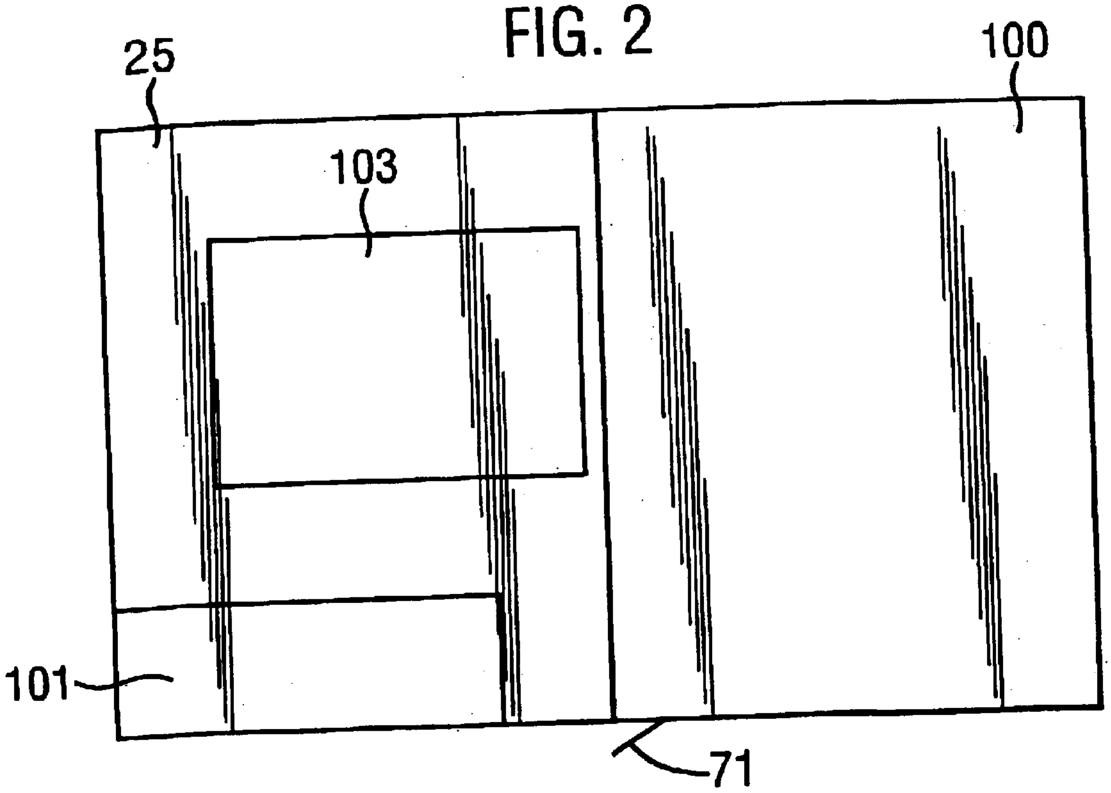
FIG. 2 is a schematic plan view of an underside of the device.

Rear face 25 of the casing is shown in FIG. 2. Rear face 25 has a detachable panel 100 which when removed allows access to reel 72 for replacement thereof. Rear face 25 has a second detachable panel 101 which allows access to the battery for replacement when it becomes drained.

In the centre of the rear face 25 there is a magnet 103. Magnet 103 allows the label dispenser 10 to be attached to a metal surface (not shown), such as a refrigerator.

Figure 3:
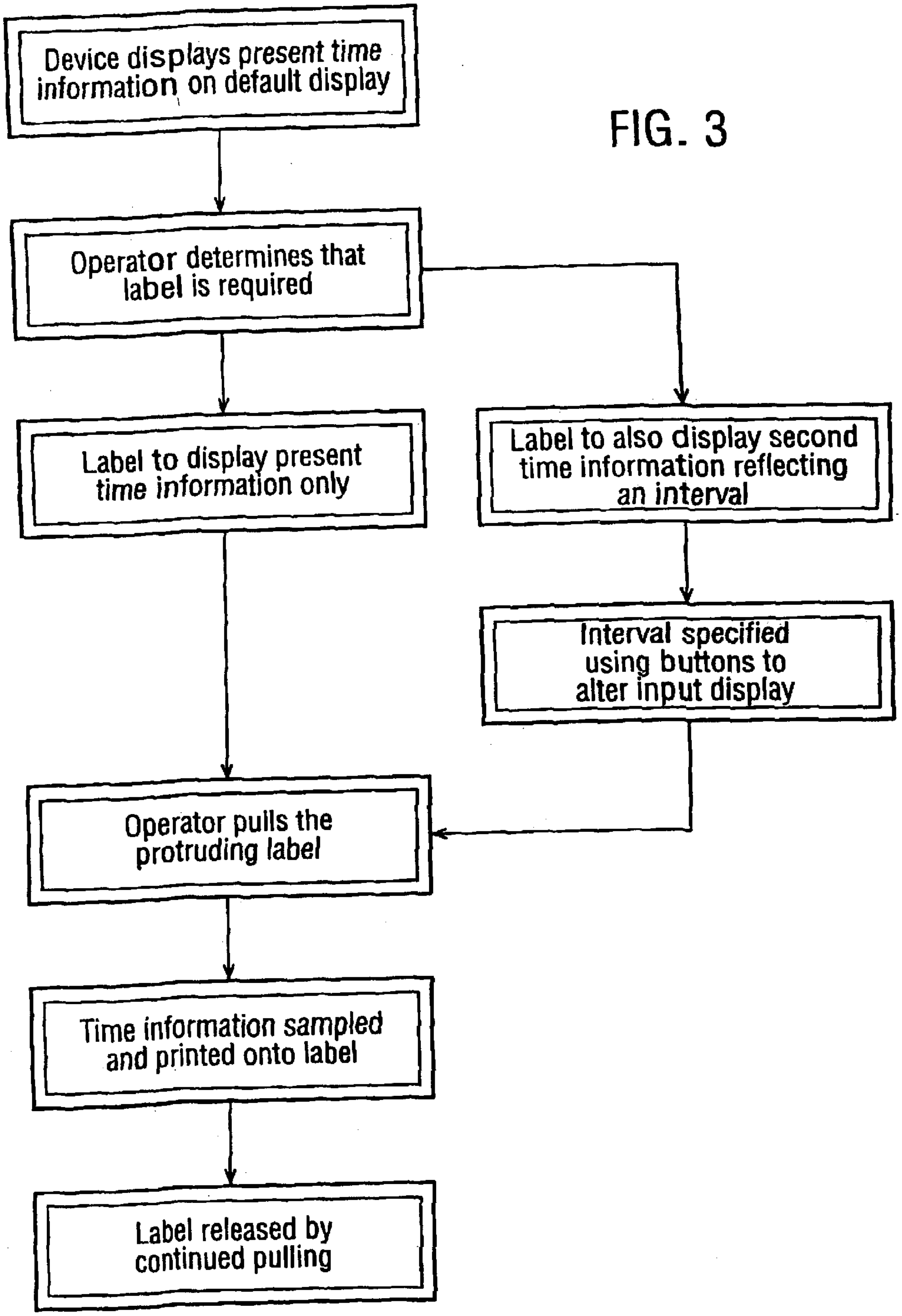
FIG. 3 is a flow diagram of the steps involved in generating a label using the present invention.

FIG. 3 shows a flow diagram for the label dispenser 10 in use. Prior to use default display 42 shows the date and time in the format described above. Every minute microprocessor 35 updates the time shown on default display 42. In the default setting display digits 51 and 52 are set to zero.

At this point the user has two choices. First, the operator could decide to obtain a label printed with only the information shown on default display 42. Alternatively, the operator can choose to obtain a label printed with both the information shown on default display 42 and future date, offset by an appropriate period of time.

The time period is manually input by the user, using buttons 52 and 54 to log days in the microprocessor unit, which are then in turn displayed on input display 43. For example, if a time period of twelve days is the consume within opening term, the operator would press button 52 once, so the left hand digit shows 1, and button 54 twice, so the right hand digit shows 2. In this embodiment the integer shown on the input display specifies a number of days but it should be noted that the integer could be chosen to specify a number of months etc.

The label dispenser is activated by the operator pulling on the tip of label 71 protruding through opening 70. Pulling on the label actuates motion sensor (not shown) which activates microprocessor unit 35 to sample the information shown on default display 42 and add the time period displayed in 43 and stored in the processor unit's memory. Where the input display shows zero the microprocessor instructs print head 60 to print only the time information shown on the default display. If the digits of the input display show a specified period the microprocessor instructs the print head to print both the time information on the display and the second time information calculated by adding the period shown on the input display to the first time information.

Once label 71 has been printed continued pulling on the label causes the roll of labels 72 to rotate on the spigot 74 and allows access to the label for release. The motion sensor is reactivated when a fresh label is under the print head.

Once the label is released it can be adhered to the package which has just been opened, or is about to be opened.

The main use for the present invention is to provide date marked labels for providing time information about foodstuffs or pharmaceutical products. However, its uses are not limited to these fields and may include any field where it would be desirable to have labels marked with time information. For example, the first time information may convey when any article was acquired, added to, altered, completed, dismantled, opened, put into storage, packed, processed, procured, or sealed. The second time information, if chosen, enables the label to either convey a specific period within, or provide a point after, which an action may need to be carried out. Possible actions could be adding to, altering (by for example chilling, freezing, heating, reheating), completing, consuming, destroying, dismantling, disposing of, processing, procuring, putting into storage, sealing, or transporting the article. The present label dispenser is envisaged to have both domestic and non-domestic functions.

Where the word time is used it should be understood to include dates and include any of the following information; seconds, minutes, hours, days, months and years. The sensitivity of the clock means will depend upon the particular application and the likely time periods to be adjusted.

What is claimed is:

1. A device for dispensing labels marked with time information relating to a time-dependent characteristic of a product, which device is sized and weighed to be portable and comprises: clock means for generating current time information; time adjustment means for storing an adjustment time period and adding the period to the current time information thereby to generate future time information; user responsive actuation means for sampling current time information and the calculated future time information; label marking means for marking sampled time information onto the labels; and a label dispensing mechanism for dispensing marked labels from the device; wherein the actuation means is adapted to permit device operation in at least three user-selected modes, a first mode in which the current time data is printed and not future time data, a second mode in which the current and future time data is printed, and a third mode in which the future and not the current time data is printed on the label.

2. A device as claimed in claim 1, wherein the actuation means includes manual inputting means for selecting the time adjustment period which is the time period added to the current time information to arrive at the future time information.

3. A device as claimed in claim 1, wherein the actuation means includes display means for displaying current and/or calculated future time information.

4. A device as claimed in claim 1, wherein the actuation means includes an actuation button for initiating information sampling, label marking and label dispensing.

5. A device as claimed in claim 1, wherein the actuation means is adapted to initiate time information sampling, label marking and label dispensing by applying a pulling force to a protruding portion of the label.

6. A device as claimed in claim 1, wherein the time adjustment period is a fixed predetermined time period, and on actuation the device, in the second mode or the first mode, automatically prints the future time.

7. A device as claimed in claim 1 and provided with mounting means for locating or attaching the device to a surface.

8. A device as claimed in claim 1, wherein the time data is calender data including one or more of day, month and year.

9. A device as claimed in claim 1, wherein the time information is one or more of hours, minutes and seconds.

10. A device as claimed in claim 1, wherein the period of time added to the current time information to generate the future time information is user-selectable.

* * * * *